United States Patent [19]

Jackson

[11] Patent Number: 4,776,127
[45] Date of Patent: Oct. 11, 1988

[54] AERATOR

[76] Inventor: Calvin J. Jackson, P.O. Box 2066, Henderson, Tex. 75652

[21] Appl. No.: 894,891

[22] Filed: Aug. 8, 1986

[51] Int. Cl.⁴ .................... A01K 63/00; A01K 97/04
[52] U.S. Cl. ........................................ 43/57; 119/5; 261/121.2; 210/220
[58] Field of Search .................. 43/57; 261/121.2; 119/5; 210/220

[56] References Cited

U.S. PATENT DOCUMENTS

| 754,317 | 3/1904 | Kaltenegger | 43/57 |
| 2,408,306 | 9/1946 | Flournoy | 43/57 |
| 2,639,906 | 5/1953 | Butler | 43/57 |
| 2,865,618 | 12/1958 | Abell | 43/57 |
| 3,820,272 | 6/1974 | Rowe | 43/57 |
| 4,192,255 | 3/1980 | Willinger | 119/5 |
| 4,627,797 | 12/1986 | Rill | 43/57 |

FOREIGN PATENT DOCUMENTS 189214  9/1907  Fed. Rep. of Germany .......... 43/57

Primary Examiner—Kurt Rowan
Attorney, Agent, or Firm—Berman, Aisenberg & Platt

[57] ABSTRACT

An aerator for distributing air bubbles in the water of a bait-bucket or aquarium includes a porous hose having a wall in which a multiplicity of relatively small, in transverse cross-section, irregularly shaped, labyrinth-type channel provide many through-the-wall air-seepage passageways allowing air bubbles to enter the water. A small battery powered or A.C. pump is used to supply air to the hose.

5 Claims, 1 Drawing Sheet

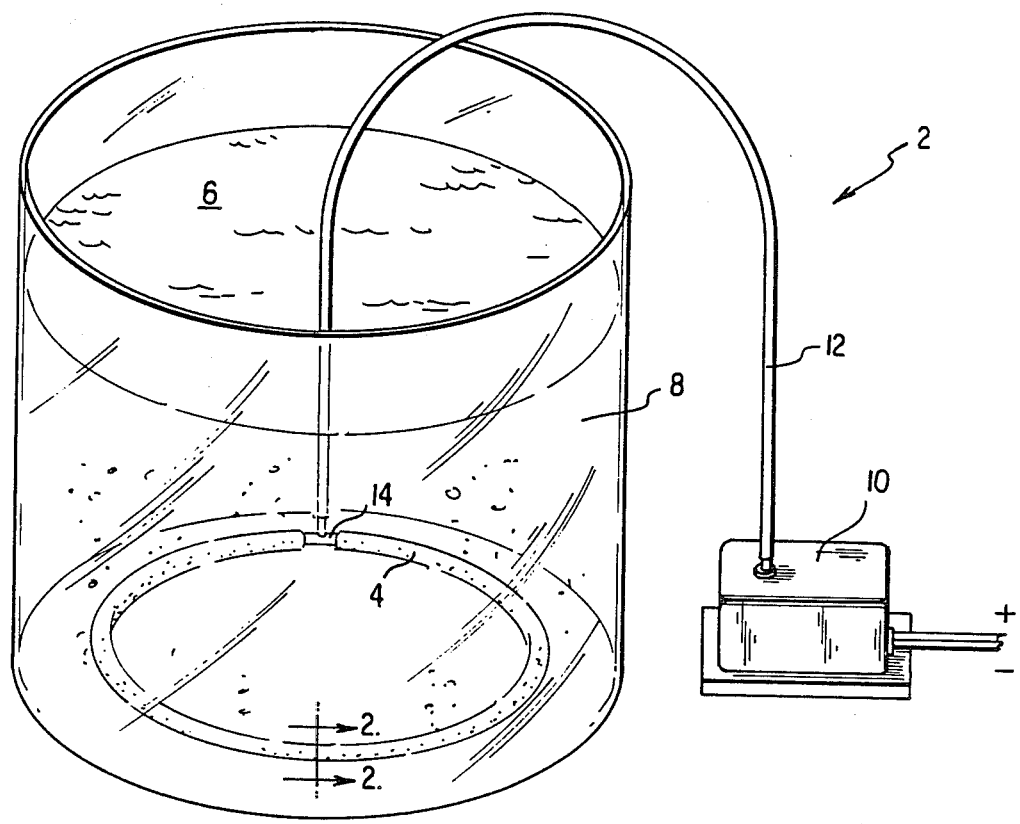
FIG. 1
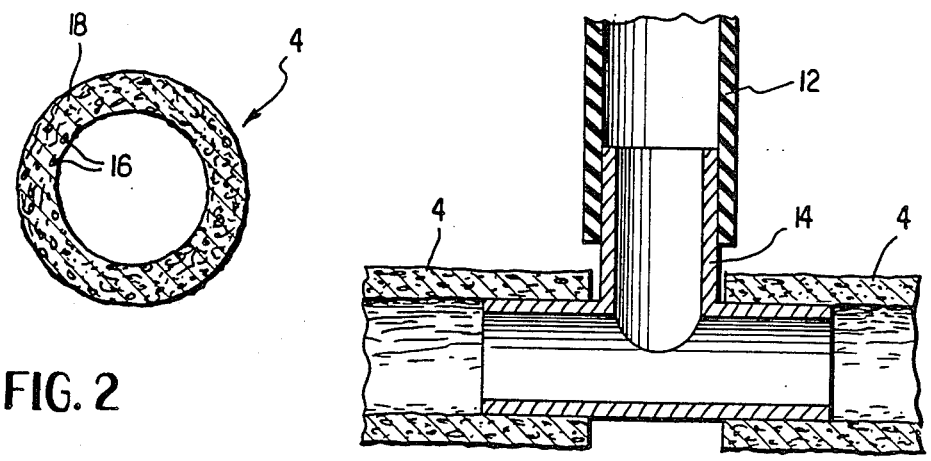
FIG. 2
FIG. 3

AERATOR

FIELD OF THE INVENTION

This invention relates to an aerator for a bait-bucket or aquarium.

BACKGROUND OF THE INVENTION

Aerators, useful for aerating aquariums and bait buckets to maintain fish or bait alive, are known in the art. Many types of aerators per se are known, for example, Rowe, U.S. Pat. No. 3,820,272, shows a porous stone through which air is diffused. Howard, U.S. Pat. No. 3,217,444, and Abell, U.S. Pat. No. 2,865,618 describe metal screen diffusers. Coleman, U.S. Pat. No. 1,731,921, Ayers, U.S. Pat. No. 668,899, and Evans, U.S. Pat. No. 299,765, each show perforated elongate pipes for distributing air.

Porous irrigation pipe for distributing water is shown in Turner, U.S. Pat. Nos. 4,003,408, 4,110,420, and 4,168,799. The material of Turner has been proposed for use in aerating sewage sludge.

SUMMARY OF THE INVENTION

The invention relates to a new use as a fish container aerator, for a porous hose pipe which was previously known and used for distributing water for irrigation. In an aerator of the invention, a porous hose having a wall comprising a multiplicity of relatively small (in transverse cross-section), irregularly shaped, labyrinth-type channels, provides many through-the-wall air-seepage passageways for diffusing air in small bubbles into a body of water in a bait-bucket or aquarium containing aquatic life, such as bait or fish, to aerate the water to keep the bait or fish in live condition.

Air is supplied to the porous hose by a small battery-powered pump or A.C. Current Pump to provide an easily portable but highly effective aerator.

It is an object of the invention to provide an aerator having a porous hose for use in a bait-bucket or aquarium.

It is a further object of the invention to provide an aerator in which a porous hose is immersed in a container of water, and air is pumped therethrough to maintain aquatic life in the water.

BRIEF DESCRIPTION OF THE DRAWINGS

FIG. 1 shows a porous hose aerator used for aerating a body of water.

FIG. 2 shows a cross-section of porous hose, taken on 2—2 of FIG. 1.

FIG. 3 shows a cross-section of a hose connection of FIG. 1.

DETAILED DESCRIPTION OF THE INVENTION

The invention provides a new use for a known irrigation hose such as that described in Turner, U.S. Pat. Nos. 4,003,408, 4,110,420, and 4,168,799. The disclosures of these patents are incorporated by reference. The porous irrigation pipe of Turner is known for use as a pipe for distributing water in irrigation systems, the porous hose being buried in soil or mulch and supplied with water under pressure. It has unexpectedly been found that this type of pipe is remarkably successful for diffusing air into water. For example, as preferred use is as an aerator for a bait bucket or an aquarium, in which a multiplicity of small gas bubbles is required. An aerator is used in a bait bucket or an aquarium to provide air needed to maintain the bait, fish, or other aquatic life in live condition.

The porous hose is suitably made of reclaimed, rubber-like, previously vulcanized material, such as is used for tires. The material is ground and mixed with a portion of binder, for example, a mixture of polyethylene, sulfur, and oil. The mix is formed into a porous body, conveniently a hose, having a hose wall containing a multiplicity of relatively small, in transverse cross-section, irregularly shaped labyrinth-type channels providing many through-the-wall air-seepage passageways. A method of making the porous hose is described in the Turner patents. The hose may be made of different materials, with different sizes of pores, as appropriate.

In the new use according to the invention, a porous hose is connected by conventional means to a pump, or other air distributor, which distributes air through the connector to the porous hose. When used as a bait bucket aerator, the porous hose is immersed in water containing live bait, and air is pumped through the hose to produce tiny air bubbles which emerge from the hose wall and pass into the water to maintain the bait in a live condition.

Referring now to FIGS. 1 to 3, in which like numerals represent similar parts, FIG. 1 shows a porous hose aerator 2 in which porous hose 4 is immersed in a liquid 6 in container 8. Air distributor 10 distributes air through tube 12 which is connected by connector 14 to both ends of porous hose 4, thus forming a circular porous hose. FIG. 2 is a cross-section of porous hose 4 showing a labyrinth of channels 16 in the wall 18 through which air escapes to outside the hose. FIG. 3 shows, in detail, T-shaped connector 14 which is attached to each end of porous hose 4 and to tube 12.

Air distributor 10 is preferably a battery-powered or A.C. Current pump for supplying air under pressure. Distributor 10 may be a source of compressed gas, such as air or oxygen.

When used as an aerator for a bait bucket or aquarium, as shown in FIG. 1, pump 10 is connected by tube 12 and T-shaped connector 14 to porous hose 4, and the porous hose is immersed in container 8 of water. The pump is energized by a battery (not shown), or A.C. Current and a multitude of small air bubbles emerge from the porous hose wall and pass into the water. This arrangement is extremely convenient and produces a highly efficient bait bucket which is easily transported.

Other arrangements of the porous base hose and the equipment in general will be apparent to one skilled in the art. It may be convenient to employ weights, adhesive-backed clamps, or other devices, for retaining the hose on the floor of the bucket or aquarium.

The porous hose will not clog or deteriorate in use, and there are no parts to rust or corrode, even when used in salt water. The porous hose may be used with any type of pump or compressor to form an aeration system for a bait-bucket or aquarium.

While the invention has been described above with respect to certain embodiments thereof, it will be appreciated that various changes and modifications may be made without departing from the spirit and scope of the invention.

I claim:

1. An aerator for a live bait or fish container or aquarium containing water comprising means for supplying air under pressure, air diffusing means, and connecting means for connecting said air diffusing means to said means for supplying, wherein said air diffusing means comprises a flexible porous hose having a multiplicity of relatively small, in transverse cross section, irregularly shaped labyrinth-type channels providing many through-the-wall air-seepage passageways for diffusing air into the water and wherein said air diffusing means comprises primarily rubber-like, previously vulcanized material, which has been ground, mixed with a binder, and formed.

2. An aerator of claim 1 further comprising weight means for retaining said air diffusing means means toward the bottom of a container.

3. An aerator of claim 1 wherein the flexible, porous hose has two ends, and each end is connected to the connecting means to form a ring-shaped aerator.

4. A method of aerating water in a live bait or fish container or aquarium, comprising distributing air through flexible porous hose means for diffusing gas, wherein said porous hose means comprises a flexible hose of primarily rubber-like, previously vulcanized material, which has been ground, mixed with a binder, and formed, and including a wall having a multiplicity of relatively small, in transverse cross-section, irregularly shaped, labyrinth type channels, said porous hose means being immersed in the water, whereby bubbles of air are distributed through the hose wall into the water through said multiplicity of relatively small, in transverse cross-section, irregularly shaped, labyrinth type channels of said hose means.

5. In combination, aquarium or live bait or fish container means for containing water therein, means for supplying air under pressure, air diffusing means in said aquarium or bait bucket means, and connecting means connecting said air diffusing means to said means for supplying, wherein said air diffusing means comprises a flexible porous hose having a multiplicity of relatively small, in transverse cross section, irregularly shaped labyrinth-type channels providing many through-the-wall air-seepage passageways for diffusing air into the water and wherein said air diffusing means comprises primarily rubberlike, previously vulcanized material, which has been ground, mixed with a binder, and formed.

* * * * *